Aug. 26, 1969  C. H. FAHRENDORFF  3,462,879
TOY DUMP TRUCK
Filed June 12, 1968
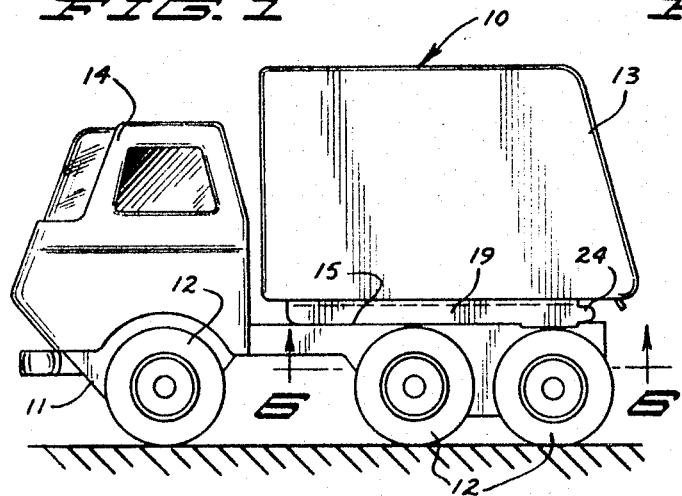
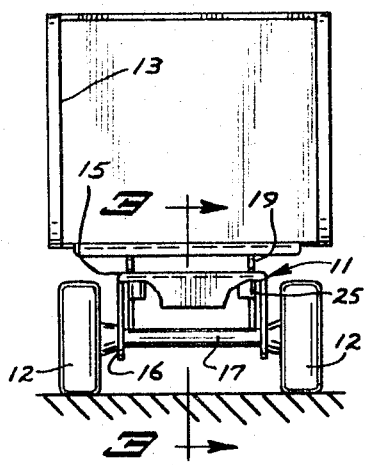
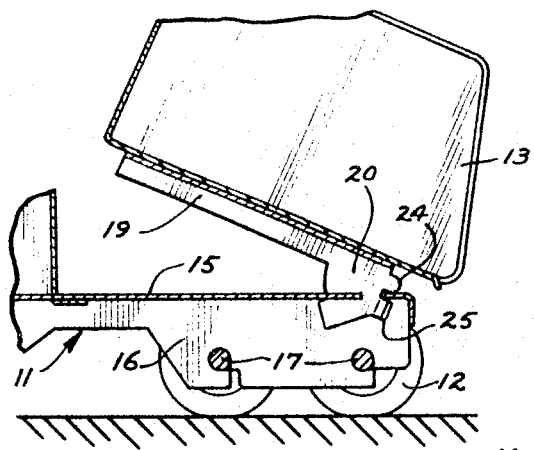
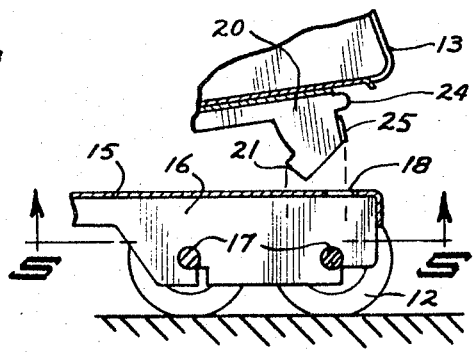
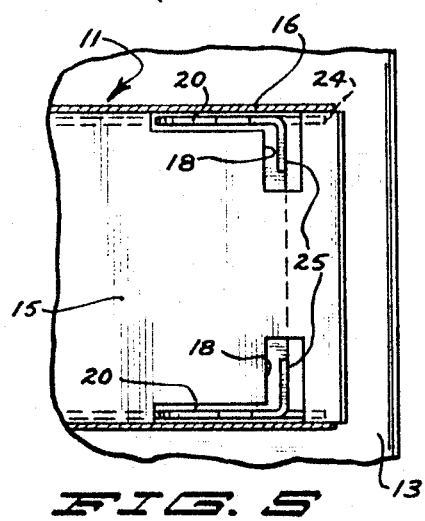
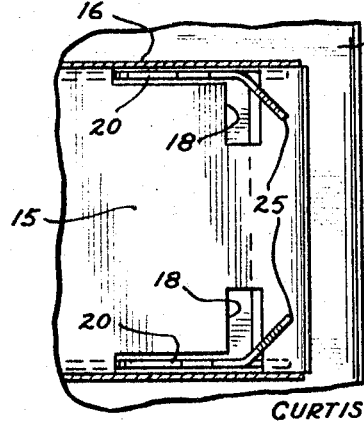
INVENTOR.
CURTIS H. FAHRENDORFF
BY
Carlsen, Carlsen, Sturm & Wicks
ATTORNEYS United States Patent Office 3,462,879
Patented Aug. 26, 1969

3,462,879
TOY DUMP TRUCK
Curtis H. Fahrendorff, Minneapolis, Minn., assignor to Tonka Corporation, Mound, Minn., a corporation of Minnesota
Filed June 12, 1968, Ser. No. 736,307
Int. Cl. A63h 17/06, 17/26
U.S. Cl. 46—214            3 Claims

ABSTRACT OF THE DISCLOSURE

A toy truck with a box or the like hingedly connected to the truck bed for movement between transport and dumping positions, the hinge connection being formed by a pair of transversely spaced hinge plates integrally depending from the rear portion of the box and extending through slots in the rear portion of the chassis and being bent after insertion through the slots to prohibit removal thereof.

---

In the manufacture of toy trucks such as dump trucks, the cargo carrying dump box is generally hinged to the truck chassis by means of a hinge pin or rivets. While such a construction is satisfactory it necessarily increases the cost of a nominally priced product.

The object of the present invention is to provide a new and improved hinge for connecting the cargo receptacle of a toy truck with the truck bed which eliminates all pins and rivets and which provides a stop for limiting dumping movement of the receptacle.

The above mentioned and other objects of the invention will be brought to light during the course of the following specification, reference being made to the accompanying drawing, in which—

FIG. 1 is a side elevation of a toy dump truck with the truck box hinged to the frame in accordance with the present invention.

FIG. 2 is a rear elevation of the truck with frame portions broken away to show the hinge elements.

FIG. 3 is a longitudinal vertical section through the rear portion of the truck taken on line 3—3 of FIG. 2.

FIG. 4 is similar to FIG. 3 but with the parts exploded in preassembly positions.

FIG. 5 is a horizontal section taken on line 5—5 of FIG. 4 and looking upwardly.

FIG. 6 is a horizontal section taken on line 6—6 of FIG. 1 and looking upwardly.

Referring now more particularly to the drawing reference characters will be used to denote like parts or structural features in the different views. A toy truck denoted generally at 10 has a body 11 supported on ground wheels 12 and having a passenger compartment or cab 14 at the front end of a rearwardly extending truck bed 15. A truck box 13 is mounted on the bed 15 for fore and aft tilting movement in a manner to be described.

As shown in FIGS. 2, 3 and 4 there are side panels 16 depending at each side of the bed 15 and these are apertured to jointly receive a pair of cross shafts 17 on which the rear wheels 12 are mounted.

Bed 15 is also provided near the rear end thereof with a pair of transversely spaced L-shaped openings 18 (FIGS. 5 and 6) with the longer leg of each extending rearwardly just inside of the panel 16 and the rear leg thereof extending inwardly.

Box 13 has an inverted channel shaped bracket 19 secured to the underside thereof. The rear ends of the side walls of bracket 19 are formed into a pair of L-shaped hinge plates denoted at 20 each adapted to be downwardly inserted into one of the openings 18. Each plate 20 extends on a fore and aft vertical plane and is provided with a forwardly projecting stop 21 near its lower edge. The upper rear edge of plate 20 is provided with a rearward projection 24 having a rounded rear edge and at a point therebelow the plate is bent inwardly to form a tab 25.

In the assembly operation the box 13 is connected to the bed 15 by lowering the hinge plates as shown in FIG. 4 into the openings 18. The side walls of channel 19 and projection 24 come to rest on the top of bed 15. Tabs 25 are then bent rearwardly from the inserted position shown in FIG. 5 to the position shown in FIG. 6, thus locking the plates 20 against withdrawal from the openings 18.

A hinge connection is thus quickly and simply formed. While the bed portion forming the rear edge of openings 18 is held between the projections 24 and tabs 25 the forward portion of each plate 20 is allowed up and down sliding movement between its juncture with the side wall of the channel and the stop 21. As the box is tilted to its dumping position the rear ends of projections 24 rock on the top of bed 15 and thus form the fulcrum axis.

I claim:
1. In a toy dump truck,
 (a) a truck body having ground wheels and a horizontal truck bed extending fore and aft relative to the direction of ground wheel movement,
 (b) said truck bed having a pair of fore and aft extending transversely spaced vertically opening slots located in the rear portion thereof,
 (c) a cargo carrying receptacle disposed upon the truck bed,
 (d) a pair of hinge plates depending vertically from the receptacle in transversely spaced parallel relation and projecting one through each of said slots,
 (e) each plate having the rear portion thereof below the bed bent out of alignment with the slot to prohibit upward withdrawal thereof but allowing the forward portion of the plate to move up and down thereby forming a hinge connection between the receptacle and bed.
2. The subject matter of claim 1 wherein at least one of said hinge plates has a forwardly projecting stop on the said forward portion thereof adapted to engage against the underside of the bed and limit upward movement of said portion.
3. The subject matter of claim 1 wherein each of said slots has an L-shape and each of said hinge plates has an L-shape in horizontal cross section for insertion into said slots, and said hinge plate rear portions forming a leg of each of said plates and projecting toward one another prior to being bent out of alignment.

References Cited

UNITED STATES PATENTS

| | | | |
|---|---|---|---|
| 519,455 | 5/1894 | Klees | 46—214 XR |
| 2,540,317 | 2/1951 | Baggott | 46—214 XR |
| 3,091,888 | 6/1963 | Patch | 46—214 XR |

FOREIGN PATENTS

| | | |
|---|---|---|
| 227,435 | 3/1960 | Australia. |
| 29,446 | 1964 | Germany. |

LOUIS G. MANCENE, Primary Examiner
H. DINITZ, Assistant Examiner

U.S. Cl. X.R.
46—223